US005398507A

United States Patent [19]

Akiyama et al.

[11] Patent Number: 5,398,507

[45] Date of Patent: Mar. 21, 1995

[54] HYDRAULIC CIRCUIT SYSTEM

[75] Inventors: Teruo Akiyama; Naoki Ishizaki; Kiyoshi Shirai; Koji Yamashita; Shin-ichi Shinozaki, all of Kanagawa, Japan

[73] Assignee: Kabushiki Kaisha Komatsu Seisakusho, Tokyo, Japan

[21] Appl. No.: 856,972

[22] PCT Filed: Sep. 26, 1991

[86] PCT No.: PCT/JP91/01284

§ 371 Date: Jun. 3, 1992

§ 102(e) Date: Jun. 3, 1992

[87] PCT Pub. No.: WO92/06304

PCT Pub. Date: Apr. 16, 1992

[30] Foreign Application Priority Data

Sep. 28, 1990 [JP] Japan .................................. 2-257237

[51] Int. Cl.⁶ ............................................... F16D 31/02

[52] U.S. Cl. ......................................... 60/433; 60/452

[58] Field of Search ................. 60/433, 446, 443, 450, 60/465, 452

[56] References Cited

U.S. PATENT DOCUMENTS

| | | | |
|---|---|---|---|
| 4,425,759 | 1/1984 | Krusche | 60/452 |
| 4,738,279 | 4/1988 | Kropp | 60/452 |
| 4,967,554 | 11/1990 | Kauss | 60/452 |

FOREIGN PATENT DOCUMENTS

| | | |
|---|---|---|
| 0010860 | 5/1980 | European Pat. Off. . |
| 57-116965 | 7/1982 | Japan . |
| 59-62702 | 4/1984 | Japan . |

*Primary Examiner*—F. Daniel Lopez
*Attorney, Agent, or Firm*—Armstrong, Westerman, Hattori, McLeland & Naughton

[57] ABSTRACT

This invention has for its aim to provide a hydraulic circuit system arranged such that, even at the time of commencement of drive of a hydraulic actuator with a large inertia, a slow rise in the drive pressure can be achieved, thereby preventing the occurrence of hunting phenomenon. The hydraulic circuit system according to the present invention comprises a plurality of operating valves (15) provided in a discharge conduit (10*a*) of a hydraulic pump (10), and pressure compensating valves (18) provided in connection conduits between these operating valves (15) and respective hydraulic actuators (16), wherein each of the pressure compensating valves (18) is set at a highest value of load pressures of each of the hydraulic actuators (16), and the displacement of the pump is controlled by a change-over valve (14) adapted to be actuated by the difference between the pump discharge pressure and the load pressure. The hydraulic circuit comprises a bypass conduit (31) connected with a load pressure introduction conduit (30) for introducing the load pressure into a pressure receiving portion of the change-over valve (14). This bypass conduit is connected through a bypass valve (32) adapted to conduct throttling of fluid in inverse proportion to the change in the area of opening of each of the operating valves (15).

4 Claims, 4 Drawing Sheets

THE PRIOR ART

HYDRAULIC CIRCUIT SYSTEM

TECHNICAL FIELD OF THE INVENTION

This invention relates to a hydraulic circuit system for supplying fluid under pressure discharged by a hydraulic pump into a plurality of hydraulic actuators.

BACKTROUND ART OF THE INVENTION

To supply fluid under pressure discharged by a hydraulic pump into a plurality of hydraulic actuators, it is only necessary to provide a plurality of operating or controlling valves in a discharge conduit of the hydraulic pump and switch over the operating valves to supply the fluid under pressure into each of the hydraulic actuators. In such an arrangement, however, upon supply of pressurized fluid into the plurality of hydraulic actuators at the same time, there is a tendency of the fluid being supplied only into hydraulic actuators with low loading, but not into those with high loading.

As a hydraulic circuit system arranged to eliminate such a disadvantage, a system as shown in FIG. 4, for example, has heretofore been proposed.

A hydraulic pump 10 shown in FIG. 4 is of a variable displacement type whose displacement or discharge flowrate per one complete revolution is varied by changing the angle of its swash plate 11, the swash plate 11 being arranged to be tilted by a large diameter piston 12 in such a direction as to reduce the displacement of the pump, and also tilted by a small diameter piston 13 in such a direction as to increase the displacement.

The above-mentioned large diameter piston 12 has a pressure receiving chamber 12*a* which is connected or disconnected by a change-over valve 14 with or from a discharge conduit 10*a* of the hydraulic pump 10, whilst the small diameter piston 13 has a pressure receiving chamber 13*a* which is connected with the above-mentioned discharge conduit 10*a*.

The discharge pipe 10*a* of the above-mentioned hydraulic pump 10 has a plurality of operating valves 15 connected therewith. Each of conduits 17 connecting the operating valves 15 with the hydraulic actuators 16 is provided with a pressure compensating valve 18. The pressure compensating valve 18 is arranged to be urged to the low pressure set side by the fluid under pressure in a first pressure receiving portion 19, and also urged to the high pressure set side by the fluid under pressure in a second pressure receiving portion 20. The first pressure receiving portion 19 is connected with an outlet of the operating valve 15, and is supplied with the fluid pressure at the outlet thereof, whilst the second pressure receiving portion 20 is connected through a shuttle valve 21 with the conduit 17, and is supplied with the highest load pressure.

The above-mentioned change-over valve 14 is adapted to be urged by the discharge pressure P1 developed by the pump which prevails in the dischage conduit 10*a* in a such a direction as to permit communication, and also urged by combination of the resilient force of a spring 22 and the aforementioned load pressure in such a direction as to allow drainage. The arrangement is made such that as the pump discharge pressure P1 becomes higher the pump discharge pressure is supplied into the pressure receiving chamber 12*a* of the large diameter piston 12 so as to tilt the swash plate 11 in such a direction as to reduce the displacement, whilst as the pump dischage pressure P1 becomes lower the pressure receiving chamber 12*a* of the large diameter pump 12 is connected to a fluid tank, thereby tilting the swash plate 11 in such a direction as to increase the displacement of the hydraulic pump.

Each of the operating valves 15 is arranged to be actuated in such a direction as to increase the area of opening thereof in proportion to the pressure of the pilot fluid under pressure from a pilot control valve 23, the pressure of the pilot fluid under pressure being proportional to the operating stroke of an operating lever 24 associated therewith.

In such a hydraulic circuit system, since fluid flowrate distribution in proportion to the area of opening of the operating valve 15 can be conducted by dint of the function of the pressure compensating valve 18 and irrespective of the magnitude of the loading of each of the hydraulic actuators, the fluid under pressure discharged by one set of hydraulic pump 10 can be supplied into each of the hydraulic actuators 16 in proportion to the amount of manipulation of each of the operating valves 15.

According to the above-mentioned hydraulic circuit system, when the operating valve 15 is opened (in short, the metering-in port is opened), by operating the operating lever 24 to supply pilot fluid under pressure from the pilot control valve 23 thereinto, the pressurized fluid discharged by the hydraulic pump 10 is sent through the pressure compensating valves 18 into the respective hydraulic actuators 16. At that time, if one of the hydraulic actuators 16 is an actuator with a large inertia, such as for example, a motor for gyration, a boom actuating cylinder or the like, a high fluid pressure is required to commence the drive thereof, however, since the pump discharge pressure is low at the beginning of opening of operating valve 15, the hydraulic actuator in question cannot be driven at the same time when the operating valve 15 begins to open.

Therefore, in order not to generate a difference between the load pressure and the pump discharge pressure, the swash plate 11 is tilted through the action of the small diameter piston 12 in such a direction as to increase the displacement of the pump so as to increase the pump discharge pressure to a relief setting pressure of a relief valve, not shown, with the result that the high fluid pressure discharged by the pump causes the hydraulic actuator 16 to commence its drive in suddenly accelerated fashion.

At that time, if the operating lever 24 is manipulated slowly so as to allow the area of opening of the operating valve 15 to be increased slowly in terms of time, then the speed of movement of the hydraulic actuator 16 exceeds a target value which corresponds to the area of opening of the operating valve 15 so that the fluid under pressure cannot be supplied into the hydraulic actuator 16 in time, which results in a drop in the load pressure.

This causes a reduction in the speed of movement of the hydraulic actuator 16, which results in a rise in the drive pressure again, thereby causing the hydraulic actuator 16 to be accelerated again while it is hunting with the manipulation of the operating lever, so that it becomes impossible to accelerate the hydraulic actuator 16 smoothly.

SUMMARY OF THE INVENTION

The present invention has been made in view of the above-mentioned circumstances in the prior art, and has for its object to provide a hydraulic circuit system arranged such that, even at the time of commencement of drive of a hydraulic actuator with a large inertia, a slow rise in the drive pressure can be achieved, thereby preventing the occurrence of hunting phenomenon.

To achieve the above-mentioned object, according to a principal aspect of the present invention, there is provided a hydraulic circuit system, comprising: a plurality of operating valves provided in a discharge conduit of a hydraulic pump; and pressure compensating valves provided in connection conduits between these operating valves and respective hydraulic actuators, wherein each of the pressure compensating valves is set at a highest value of load pressures of each of the hydraulic actuators, and also the displacement of the hydraulic pump is controlled by a change-over valve adapted to be actuated by the difference between the pump discharge pressure and the load pressure, characterized in that it comprises a bypass conduit connected with a load pressure introduction conduit for introducing the load pressure into a pressure receiving portion of the change-over valve, and this bypass conduit is connected through a bypass valve adapted to conduct throttling of fluid in inverse proportion to the change in the area of opening of each of the operating valves with a fluid tank.

According to the present invention incorporating the above-mentioned aspect, when the area of opening of the operating valve is small, part of the load pressure is introduced through a restrictor of the bypass valve to the fluid reservoir so that the load pressure introduced into the change-over valve becomes lower than the actual load pressure, thus causing a difference between the pump discharge pressure and the load pressure to thereby enable a slow response by a change in the displacement of the pump to be achieved relative to the change in the area of opening of the operating valve, with the result that at the time of commencement of drive of a hydraulic actuator with a high inertia it becomes possible to achieve a slow rise in the drive pressure and prevent the occurrence of hunting phenomenon.

The above-mentioned and other objects, aspects and advantages of the present invention will become apparent to those skilled in the art by making reference to the following detailed description and the accompanying drawings in which preferred embodiments incorporating the principles of the present invention are shown by way of example only.

DETAILED DESCRIPTION OF PREFERRED EMBODIMENTS

Figure 2:
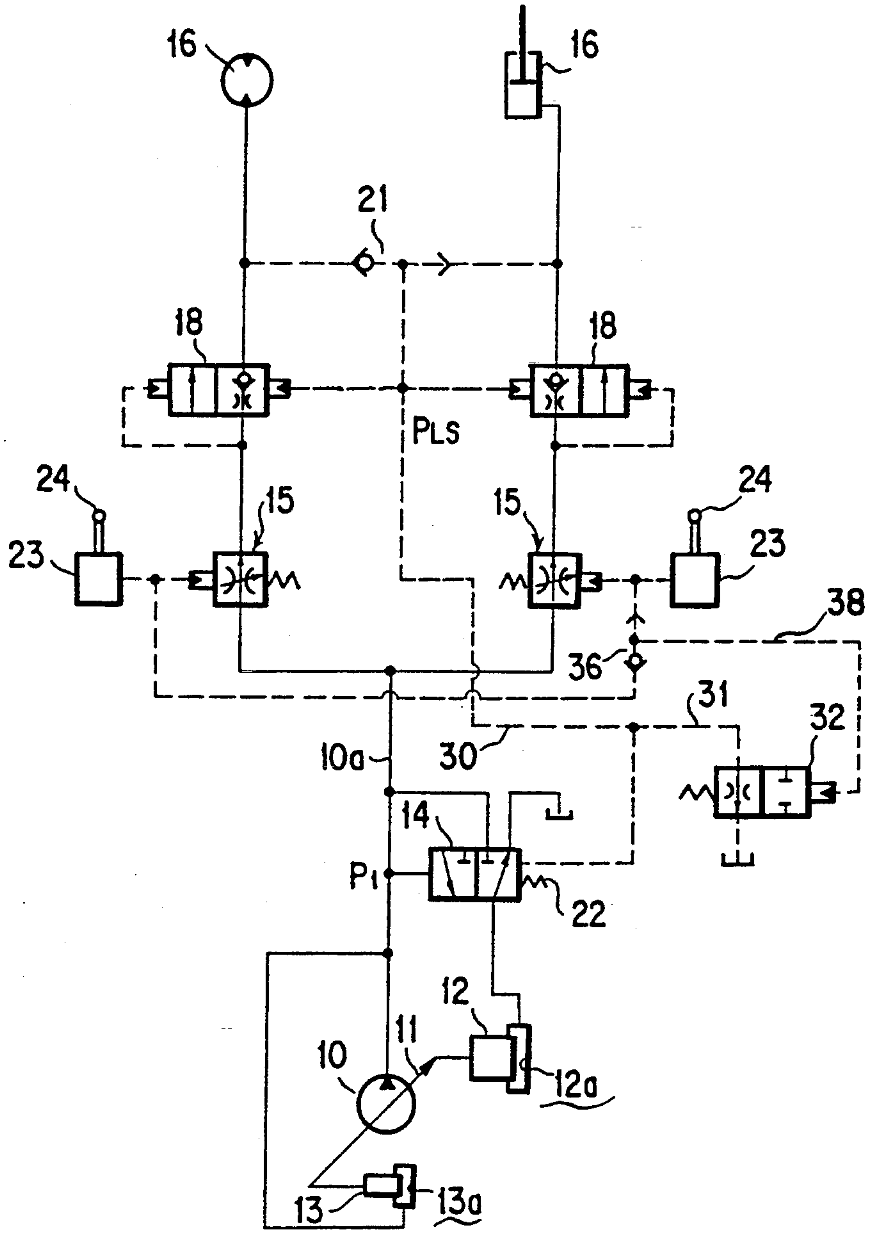
Figure 3:
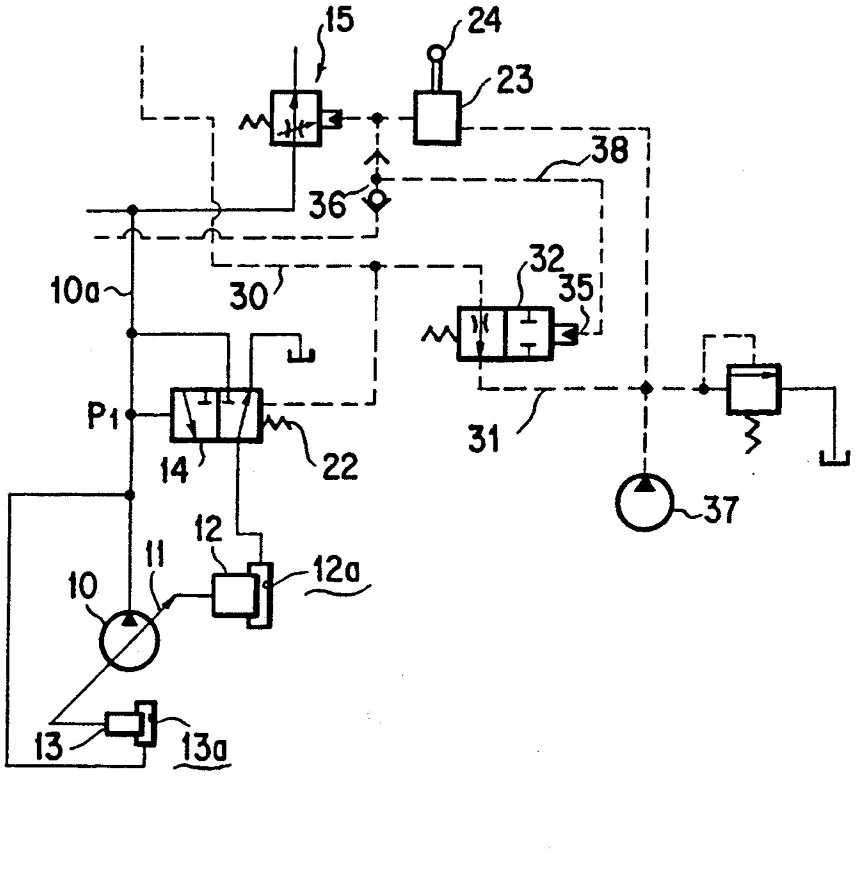
Figure 4:
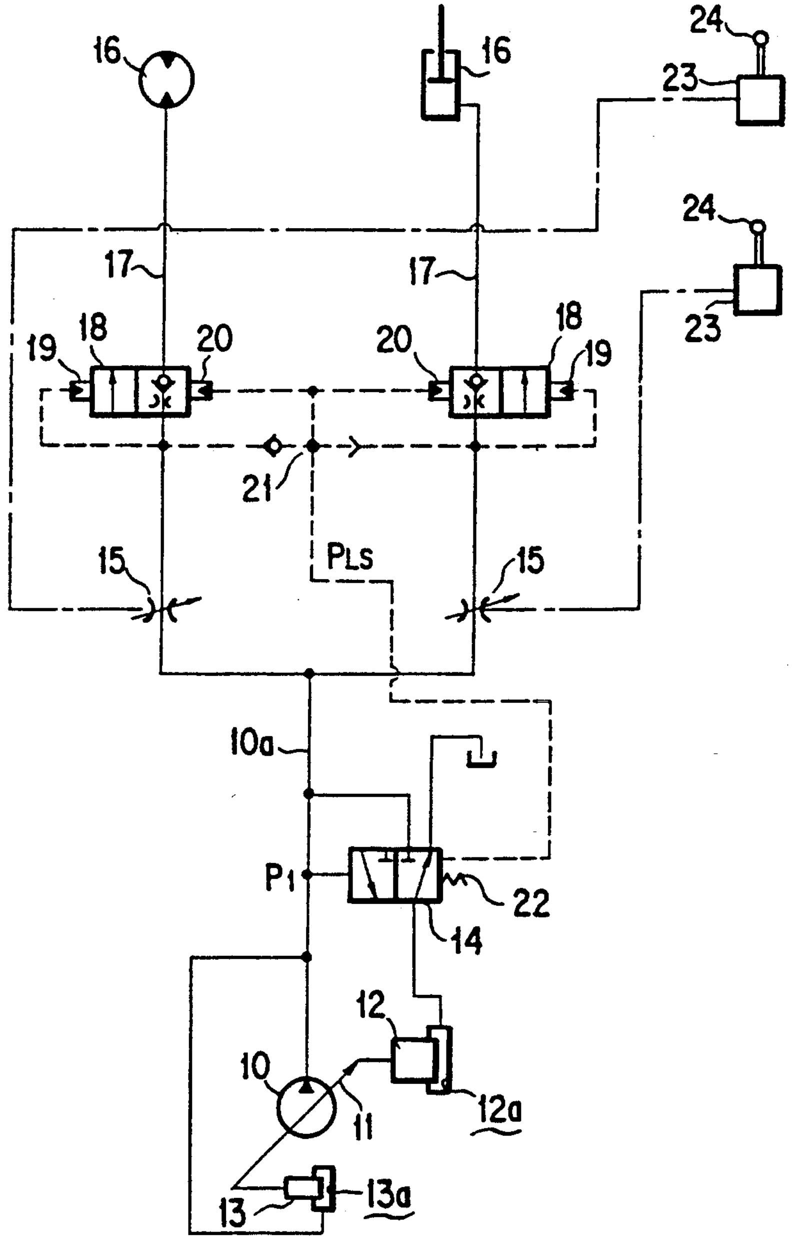
FIG. 4 is a hydraulic circuit diagram showing a prior art example.

Several embodiments of the present invention will now be described with reference to the accompanying drawings. (FIGS. 1 to 3)

The first embodiment of the present invention will be described with reference to FIG. 1.

Figure 1:
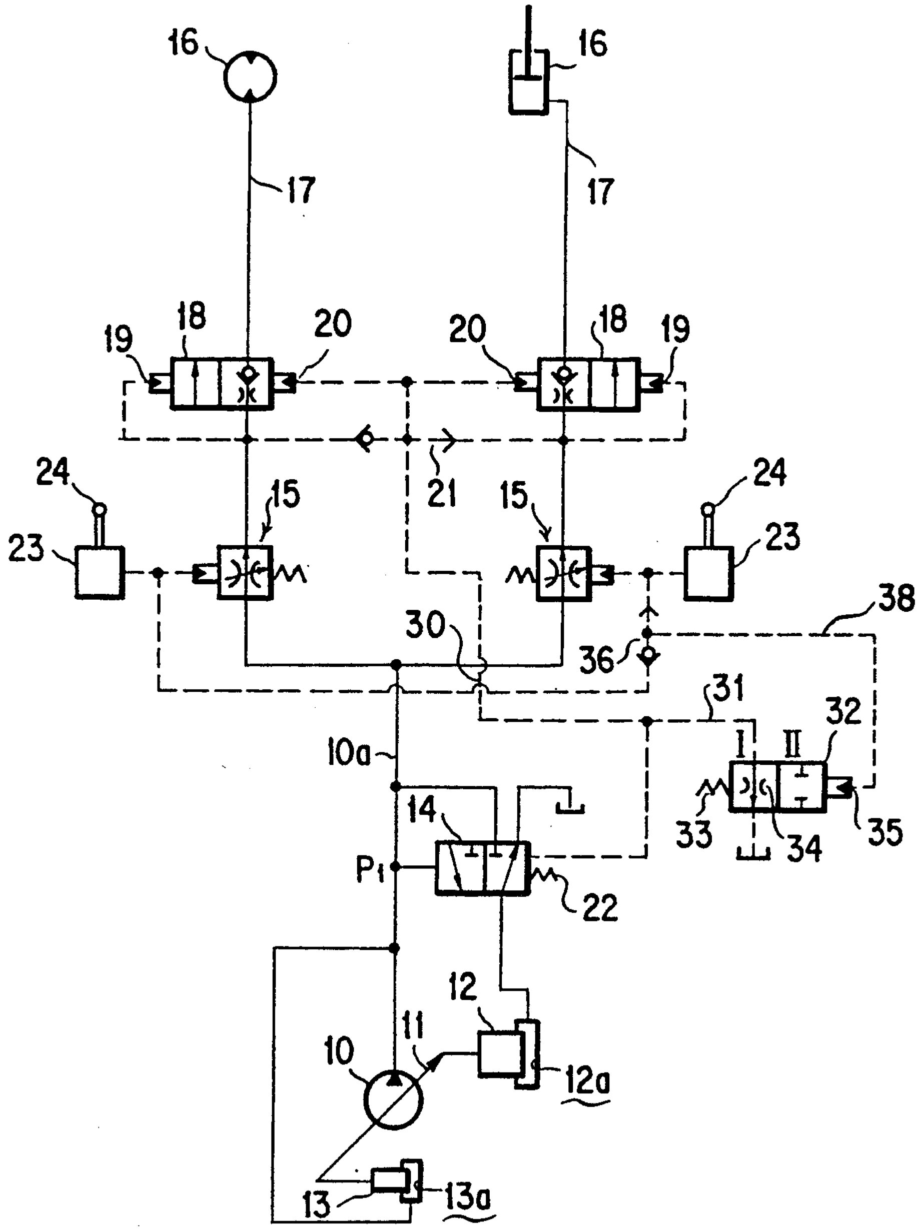
FIGS. 1, 2 and 3 are hydraulic circuit diagrams showing first, second and third embodiments, respectively, of the present invention.

As shown in FIG. 1, a load pressure introduction conduit 30 for introducing the load-pressure into a pressure receiving portion of a change-over valve 14 is connected with a bypass circuit 31 which is connected or disconnected by a bypass valve 32 with or from a fluid tank.

The above-mentioned bypass valve 32 is a pilot pressure actuated type valve adapted to be held by the resilient force of a spring 33 at a connecting position I where the bypass conduit 31 is allowed to communicate through a restrictor 34 with the fluid tank, and also held by a pilot fluid under pressure introduced through a shuttle valve 36 and a pilot fluid conduit 38 into a pressure receiving portion 35 at a disconnecting position II. The pressure receiving portion 35 is connected through the shuttle valve 36 with the output side of each pilot control valve 23.

Thus, when an operating lever 24 is held at its neutral position where the output pressure of the pilot control valve 23 is 0 $kg/cm^2$, the area of opening of the operating valve is zero (that is, the valve is in blocked condition), because it is of a closed-center type, the bypass valve 32 is held by the resilient force of the spring 33 at the connecting position I where the load pressure introduction conduit 30 is allowed to communicate through the bypass conduit 31 with the fluid tank.

When the operating lever 24 is manipulated from the above-mentioned condition so as to output a pilot fluid pressure from the pilot control valve 23 to the operating valve 15 to open the latter to thereby supply the pressurized fluid discharged by the pump through a pressure compensating valve 18 into a hydraulic actuator 16, if the hydraulic actuator 16 has a large inertia, its drive cannot be commenced, thus causing a sharp rise in the load pressure.

However, since the load pressure introduction conduit 30 is connected through the bypass conduit 31 and the bypass valve 32 with the fluid tank, part of the pressurized fluid is drained into the fluid tank so that the detected load pressure becomes lower than the actual load pressure, and the detected absolute value of difference between the pump delivery pressure and the load pressure becomes larger than the actual absolute value of difference between them. Consequently, the change-over valve 14 is urged slowly in such a direction as to increase the displacement so as to tilt the swash plate 11 of the hydraulic pump 10 slowly in a direction to increase the displacement thereof, so that the amount of fluid under pressure discharged by the pump 10 is increased slowly, thereby causing a slow increase in the load pressure.

Consequently, the hydraulic actuator 16 is accelerated slowly and the speed of movement of the hydraulic actuator 16 is kept at a value, which corresponds to the area of opening of the operating value, and does not overshoot the target value, so that hunting phenomenon will not occur unlike the prior art hydraulic circuit system.

When the operation lever 24 is moved by a predetermined stroke, for example, a full stroke and the output pressure of the pilot control valve 23 reaches a preset value, the bypass valve 32 will assume the disconnecting position II so that, although the load pressure rises sharply in the same manner as the prior art hydraulic circuit system, since the area of opening of the operating valve 15 is large and the target speed is high, hunting phenomenon will not occur and an improvement in the response thereof is obtained.

FIG. 2 shows a second embodiment of the present invention arranged such that the load pressure is detected from the outlets of the pressure compensating valves 18.

FIG. 3 shows a third embodiment of the present invention wherein the outlet of the pilot valve 32 is connected with the delivery side of an auxiliary pump 37 which supplies a source pressure for actuating the pilot control valve 23.

What is claimed is:

1. A hydraulic circuit system including a hydraulic pump and hydraulic actuators, comprising:

a plurality of operating valves provided in a discharge conduit of the hydraulic pump;

pressure compensating valves disposed in connection conduits between said operating valves and respective hydraulic actuators, wherein each of the pressure compensating valves is set at a highest value of load pressures of the hydraulic actuators;

a change-over valve controlling displacement of the hydraulic pump, said change-over valve being adapted to be actuated by a difference between pump discharge pressure and load pressure;

a load pressure introduction circuit for introducing load pressure into a receiving portion of said change-over valve;

a bypass valve connected to said change-over valve, to selectively relieve pressure from said change-over valve introduced by said load pressure introduction circuit;

a pilot control valve connected to at least one of said operating valves;

an auxiliary pump having a delivery side connected to a discharge side of said bypass valve, for supplying a source pressure for actuating said pilot control valve.

2. A hydraulic circuit system including a hydraulic pump and hydraulic actuators, comprising:

a plurality of operating valves provided in a discharge conduit of the hydraulic pump;

pressure compensating valves disposed in connection conduits between said operating valves and respective hydraulic actuators, wherein each of the pressure compensating valves is set at a highest value of load pressures of the hydraulic actuators;

a change-over valve controlling displacement of the hydraulic pump, said change-over valve being adapted to be actuated by a difference between pump discharge pressure and load pressure;

a load pressure introduction circuit for introducing load pressure into a pressure receiving portion of said change-over valve;

said load pressure introduction circuit introduces load pressure into pressure receiving portions of said pressure compensating valves for urging said pressure compensating valve to the high pressure set side;

a bypass valve connected to said change-over valve, to selectively relieve pressure from said change-over valve introduced by said load pressure introduction circuit;

said bypass valve is connected to said pressure compensating valves, to selectively relieve pressures from said pressure compensating valves introduced by said load pressure introduction circuit;

a pilot control valve connected to at least one of said operating valves;

an auxiliary pump having a delivery side connected to a discharge side of said bypass valve, for supplying a source pressure for actuating said pilot control valve.

3. A hydraulic circuit system including a hydraulic pump and hydraulic actuators as set forth in claim 1 or 2, wherein:

said load pressure is detected from the inlets of said pressure compensating valves.

4. A hydraulic circuit system including a hydraulic pump and hydraulic actuators as set forth in claim 1 or 2, wherein:

said load pressure is detected from the outlets of said pressure compensating valves.

* * * * *